(12) United States Patent
Armacanqui et al.

(10) Patent No.: US 8,728,659 B2
(45) Date of Patent: May 20, 2014

(54) ALKALINE CELL WITH ADDITIVE FOR IMPROVED DISCHARGE PERFORMANCE

(75) Inventors: M. Edgar Armacanqui, Madison, WI (US); Andrew J. Roszkowski, Waunakee, WI (US); Donald Raymond Crowe, Jr., Dodgeville, WI (US)

(73) Assignee: Spectrum Brands, Inc., Middleton, WI (US)

(*) Notice: Subject to any disclaimer, the term of this patent is extended or adjusted under 35 U.S.C. 154(b) by 771 days.

(21) Appl. No.: 12/790,184

(22) Filed: May 28, 2010

(65) Prior Publication Data

US 2011/0294004 A1    Dec. 1, 2011

(51) Int. Cl.
    *H01M 6/04*    (2006.01)
(52) U.S. Cl.
    USPC ............................................. 429/206; 429/229
(58) Field of Classification Search
    USPC ........................................................ 429/229
    See application file for complete search history.

(56) References Cited

U.S. PATENT DOCUMENTS

| | | | | |
|---|---|---|---|---|
| 5,202,400 | A | * | 4/1993 | Itoh et al. ...................... 526/240 |
| 5,686,204 | A | * | 11/1997 | Bennett et al. ................ 429/217 |
| 6,040,088 | A | | 3/2000 | Bennett et al. |
| 6,156,848 | A | * | 12/2000 | Sackmann et al. ......... 525/329.1 |
| 2004/0058159 | A1 | * | 3/2004 | Gagliardi et al. .......... 428/411.1 |
| 2008/0193851 | A1 | * | 8/2008 | Armacanqui et al. ........ 429/300 |

* cited by examiner

*Primary Examiner* — Patrick Ryan
*Assistant Examiner* — Lucas J. O'Donnell
(74) *Attorney, Agent, or Firm* — Armstrong Teasdale LLP

(57) ABSTRACT

The present disclosure generally relates to an alkaline electrochemical cell comprising an additive for improved discharge performance. The additive is a finely dispersed superabsorbent material comprising particles having a substantially uniform shape and a small particle size relative to typical materials used in alkaline cells. The superabsorbent material results in enhanced discharge performance of the alkaline cell by increasing access of zinc to the electrolyte.

16 Claims, 3 Drawing Sheets

ALKALINE CELL WITH ADDITIVE FOR IMPROVED DISCHARGE PERFORMANCE

FIELD OF THE DISCLOSURE

The present disclosure generally relates to an alkaline electrochemical cell comprising an additive for improved discharge performance. The additive is a finely dispersed superabsorbent material comprising particles having a substantially uniform shape and a small particle size relative to typical materials used in alkaline cells. The superabsorbent material results in enhanced discharge performance of the alkaline cell by increasing access of zinc to the electrolyte.

BACKGROUND OF THE DISCLOSURE

Generally speaking, the basic structure of a primary alkaline cell includes a positive electrode ("cathode") that receives electrons from a negative electrode ("anode") that releases electrons. The cathode is joined to a positive terminal of the battery by a drawn steel container. The negative electrode is typically a high-surface area metal such as zinc. The anode metal is provided in an electrolyte solution, such as potassium hydroxide dissolved in water, the electrolyte solution being the ion transfer medium between the anode and cathode. A separator which passes ions, but not electrons, is placed between the electrodes.

It is common in the art to provide a gelled anode wherein the gelled portion includes the anode metal, provided as a powder, an aqueous alkaline electrolyte, and a gelling agent for fixing the anode metal and electrolyte in the gel state. Organic and inorganic inhibitors can be added to the anode to suppress gas generation and silicate inhibitors can be added to the anode to suppress electrical shorting through the separator. Conventional gelling agents include carboxymethylcellulose, cross-linking-type branched polyacrylic acid, natural gum, or the like. A typical anode metal is a zinc alloy powder.

Superabsorbent materials can be used in alkaline cells as electrolyte reservoir sites and can also be used to improve zinc particle-to-particle contact. Conventional materials used as superabsorbent materials are polyacrylics that have an irregular shape and a large particle size distribution. The irregular shape and the large particle size distribution of the superabsorbent materials used in conventional alkaline cells can result in inadequate electrolyte availability at some sites within the anode assembly and at the discharge fronts, leading to incomplete discharge at these sites. Further, superabsorbent materials of large sizes can form agglomerates, which can add to the accumulation of discharge reaction products and adversely impact zinc particle-to-particle contact, making some zinc inaccessible.

During discharge, such as by high current drawn from a battery, water is consumed at cathode reaction sites as follows:

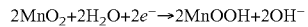

Simultaneously, at the anode electrode, hydroxide ions are needed to sustain the following anodic cell reaction:

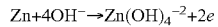

The resulting net cell reaction is therefore:

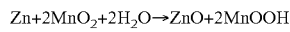

The net cell reaction suggests that a continuous supply of water from the electrolyte is necessary to sustain the net cell reaction and avoid early failure due to electrolyte starvation.

The industry has seen an increased demand for use of such cells in high-current environments, including portable audio equipment, cameras and flashes. Cells are likely to discharge in such applications faster than in previous applications. These cells are more sensitive to erratic internal resistance and require the availability of adequate amounts of electrolyte.

Accordingly, there remains a need in the art for an alkaline electrochemical cell that has enhanced cell discharge performance.

SUMMARY OF THE DISCLOSURE

Briefly, therefore, the present disclosure is directed to a gelled anode for use in an alkaline electrochemical cell. The gelled anode comprises an aqueous alkaline electrolyte, a zinc alloy powder, a gelling agent, and a superabsorbent material comprising particles, wherein the superabsorbent material particles have a substantially uniform shape.

The present disclosure is also directed to an alkaline electrochemical cell comprising a cathode, a gelled anode and a separator disposed between the cathode and the anode. The gelled anode comprises an aqueous alkaline electrolyte, a zinc alloy powder, a gelling agent, and a superabsorbent material comprising particles, wherein the superabsorbent material particles have a substantially uniform shape.

BRIEF DESCRIPTION OF THE DRAWINGS

It is to be noted that corresponding reference characters indicate corresponding parts throughout the several views of the drawings.

It is to be noted that the design or configuration of the components presented in these figures are not to scale, and/or are intended for purposes of illustration only. Accordingly, the design or configuration of the components may be other than herein described without departing from the intended scope of the present disclosure. These figures should therefore not be viewed in a limiting sense.

DETAILED DESCRIPTION OF THE DISCLOSURE

In accordance with the present disclosure, an improved anode has been discovered for maximizing the discharge capacity in alkaline cells. Maximum discharge capacity in alkaline cells is at least in part dependent upon the availability of the electrolyte to enhance the discharge capacity of the anode and the cathode active ingredients. In the present disclosure, the anode is a gelled anode and uses a finely dispersed superabsorbent material comprising particles of substantially uniform shape, and preferably a small particle size, relative to superabsorbent materials in conventional gelled anodes. The improved anode of the present disclosure enhances discharge performance by increasing access of zinc to the electrolyte, which is made available by the fine superabsorbent material particles.

In particular, it has been discovered that the improved gelled anode of the present disclosure can be used in an alkaline electrochemical cell in order to improve discharge performance.

A. Terms

It is to be noted that as used herein, the following terms or phrases, or variations thereof, generally have the following meanings.

The term "superabsorbent material" generally refers to an absorbent material which is capable of absorbing up to about 400 times of its own weight in distilled water. Preferred superabsorbent materials of the present disclosure are polyacrylic superabsorbent materials.

Figure 2A:
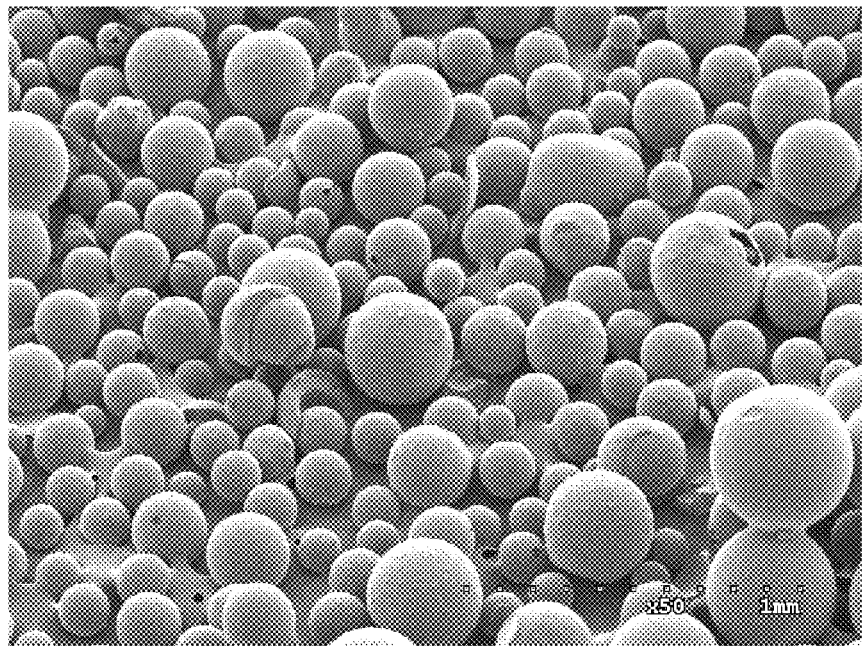
FIG. 2A depicts an exemplary embodiment of the superabsorbent material particles of the present disclosure.
Figure 3:
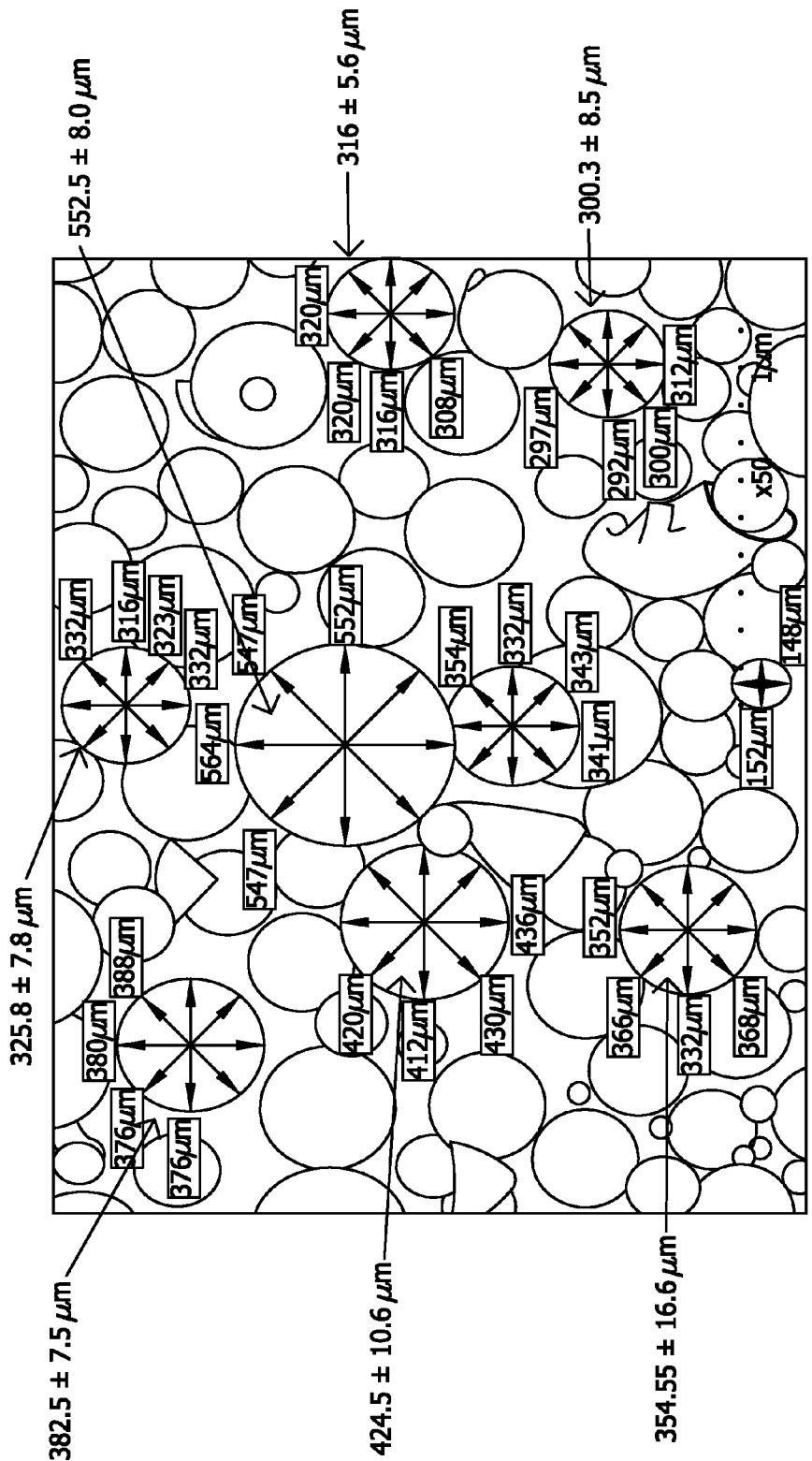
FIG. 3 depicts an expanded view of an exemplary embodiment of the superabsorbent material particles of the present disclosure (and of FIG. 2A), wherein exemplary radial distances are provided (for purposes of illustration only, and therefore are not to be viewed in a limiting sense).

The term "substantially spherical" particles generally applies to particles having a shape approximating that of a sphere, and refers to a class of shapes wherein the shape is bounded by a surface consisting of points at a given distance, or radius, from a point constituting the center of the shape. As illustrated in FIGS. 2A and 3, the radial distance of peripheral points to the center of the spherical particles can typically vary between each point by about 1.0% to about 15%, or about 2% to about 12%. Additionally, at least about 10% or about 25% by weight of the superabsorbent material particles are spherical particles, and preferably between 50% and about 95% of the particles are spherical in shape. Preferred shapes are beads, such as those depicted in FIGS. 2A and 3, produced by microbead technologies known in the art.

The term "substantially uniform" generally refers to particles having the same form, manner, or shape, which does not vary significantly, such as those depicted in FIG. 2A. Slight deviations of the particle shape are possible.

The term "fine", when referring to zinc particles, generally refers to particles that have a particle size that pass a 200 mesh screen size. That is, particles that have a particle size that is less than about 75 microns.

B. Gelled Anode

In one embodiment of the present disclosure, a gelled anode is disclosed for use in an alkaline electrochemical cell. The gelled anode comprises an aqueous alkaline electrolyte, a zinc alloy powder, a gelling agent and a superabsorbent material comprising particles, wherein the superabsorbent material particles have a substantially uniform shape.

Superabsorbent materials in anodes can be used as electrolyte reservoir sites in alkaline cells and can improve the zinc particle-to-particle contact within the cells. Conventional superabsorbent materials have an irregular shape and a large particle size distribution. The large size of the particle size distribution can result in inadequate electrolyte availability at some sites of the anode assembly and at the discharge fronts, which can lead to incomplete discharge at these sites. Further, superabsorbent particles of larger size can have adverse impact on zinc particle-to-particle contact, which lowers the active anode surface.

The gelled anode of the present disclosure maximizes electrolyte availability throughout the anode gel by using superabsorbent materials comprising particles having a particle size of from about 75 microns to about 500 microns. Preferably, the superabsorbent materials comprise particles having a size of from about 150 microns to about 500 microns. In another embodiment of the present disclosure, the superabsorbent materials comprise particles having a particle size ranging from about 30 microns to about 160 microns.

Regarding the particle size distribution of the substantially uniform superabsorbent material particles, in one embodiment of the present disclosure about 10% (by volume) of the substantially uniform superabsorbent material particles have a particle size of about 190 microns or less; about 25% (by volume) of the substantially uniform superabsorbent material particles have a particle size of about 245 microns or less; about 50% (by volume) of the substantially uniform superabsorbent material particles have a particle size of about 300 microns or less; about 75% (by volume) of the substantially uniform superabsorbent material particles have a particle size of about 370 microns or less; and, about 90% (by volume) of the substantially uniform superabsorbent material particles have a particle size of about 480 microns or less. In another embodiment of the present disclosure, about 10% (by volume) of the substantially uniform superabsorbent material particles have a particle size of about 35 microns or less; about 25% (by volume) of the substantially uniform superabsorbent material particles have a particle size of about 55 microns or less; about 50% (by volume) of the substantially uniform superabsorbent material particles have a particle size of about 84 microns or less; about 75% (by volume) of the substantially uniform superabsorbent material particles have a particle size of about 120 microns or less; and, about 90% (by volume) of the substantially uniform superabsorbent material particles have a particle size of about 160 microns or less.

TABLE 1

Particle Size Distribution Comparison Between Flocare ® Superabsorbent Materials and Salsorb ® CL15

| Volume % | Salsorb ® µm | Flocare ® GB300 µm | Flocare ® GB290 µm |
| --- | --- | --- | --- |
| 10 | 230 | 187 | 34.1 |
| 25 | 323 | 242 | 54.6 |
| 50 | 485 | 301 | 83.7 |
| 75 | 673 | 366 | 119 |
| 90 | 783 | 479 | 158 |

As shown in TABLE 1, two exemplary embodiments of the superabsorbent materials of the present disclosure (Flocare® GB300 and Flocare® GB290) have a smaller superabsorbent material particle size than Salsorb®, which is a conventional superabsorbent material used in the art. It is to be noted that if the superabsorbent material particle size distribution is too large (e.g., greater than about 500 microns), then agglomerates can form that have a negative effect on overall anode and cell performance. If the superabsorbent material particle size is too fine (e.g., less than about 75 microns) however, then the superabsorbent material particles can coat the zinc alloy particles and decrease the zinc particle-to-particle contact, which reduces the net active zinc surface for discharge. Accordingly, the superabsorbent material particle size of the present disclosure is such that the particle size avoids the pitfalls of conventional, larger particle size (e.g., Salsorb®) while not being small enough that a negative impact on cell performance would occur.

In yet another embodiment of the present disclosure, as shown in TABLE 2, the mean particle size distribution of the superabsorbent material particles is about 330 microns and the median particle size distribution of the superabsorbent material particles is about 300 microns. In another embodiment of the present disclosure, the mean particle size distribution of the superabsorbent material particles is about 90 microns and the median particle size distribution of the superabsorbent material particles is about 83 microns.

TABLE 2

Mean and Median Particle Size Distribution Comparison Between Flocare ® Superabsorbent Materials and Salsorb ® CL15

| Sample ID: | Mean psd, μm: | Median psd, μm: |
|---|---|---|
| Salsorb ® CL15 | 498.1 | 485.3 |
| Flocare ® GB 300 | 330.8 | 300.6 |
| Flocare ® GB 290 | 90.94 | 83.73 |

In another embodiment of the present disclosure, the superabsorbent material particles have a substantially uniform shape. In a preferred embodiment of the present disclosure, the superabsorbent material particles have a substantially uniform and a substantially spherical shape (see, e.g., FIG. 2A). The substantially uniform and substantially spherical shape of the superabsorbent material particles allows for improved electrolyte distribution across the anode gel and also aids in gel processing. In particular, as discussed in further detail of the Examples of the present disclosure, the American National Standards Institute (ANSI) discharge performances for cells with the gelled anode of the present disclosure have been improved, particularly with respect to high rate discharge of alkaline cells.

In a preferred embodiment of the present disclosure, the radial distance of peripheral points to the center of the spherical particles can vary between each point by about 1.0% to about 15%.

In one embodiment of the present disclosure, at least about 10% by weight of the superabsorbent material particles have a substantially spherical shape. More suitably, at least about 25%, at least about 50%, at least about 75% or at least about 90% by weight of the superabsorbent material particles have a substantially spherical shape. In an alternative embodiment of the present disclosure, between at least about 50% and at least about 95% of the superabsorbent material particles have a substantially spherical shape.

Figure 2B:
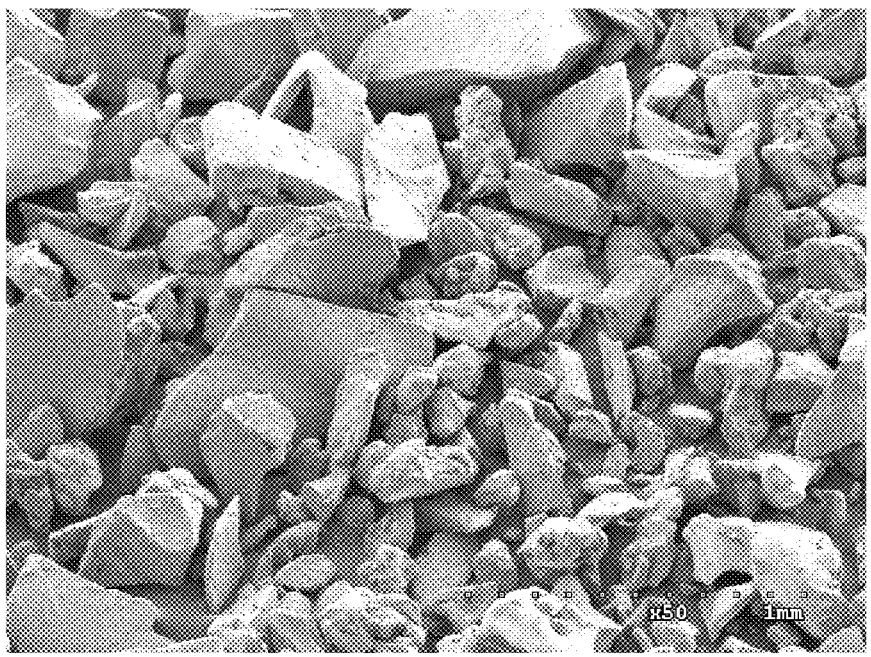
FIG. 2B depicts an exemplary embodiment of conventional superabsorbent material particles.

In particular, the substantially spherical shape of the superabsorbent material particles allows for improved superabsorbent material distribution throughout the gelled anode and improves the gel processability relative to conventional superabsorbent materials used in the art, which have an irregular shape. Additionally, the substantially spherical shape of the superabsorbent material particles allows for a better distribution of the superabsorbent material particles throughout the anode gel mass. The substantially spherical nature of the superabsorbent material particles allows for the superabsorbent material particles to move easier between zinc alloy particles during the gelled anode mixing process. The relatively fine and substantially spherical nature of the superabsorbent material particles provides a uniform electrolyte distribution throughout the anode gel and subsequently improves access of the zinc alloy particles to the electrolyte solution. Conventional superabsorbent material particles are irregularly shaped and coarser particles (see, e.g., FIG. 2B) that can result in agglomerates of superabsorbent material particles, which in turn disrupt zinc particle-to-particle contact and have a negative impact on cell performance. These agglomerates are commonly observed in anode gels of cells made with conventional superabsorbent materials (e.g., Salsorb® superabsorbent materials) and form clumps. Superabsorbent material particles of the present disclosure, however, minimize the agglomerates within the anode gel.

A suitable superabsorbent material in accordance with the present disclosure is a sodium acrylate polymer, which can be generally described as sodium polyacrylate. Suitable examples of superabsorbent materials of the present disclosure include sodium polyacrylates sold under the names Flocare® GB300 and Flocare® GB290 by the company SNF. The superabsorbent material can be provided in the anode at a concentration ranging from about 0.02% to about 0.2% by weight of the anode gel, preferably from about 0.05% to about 0.150% by weight of the anode gel.

When the superabsorbent material is present in the anode gel within these concentration ranges, the superabsorbent material is able to absorb adequate amounts of electrolyte distributed throughout the anode gel. The amount of total electrolyte used in the cell is subject to the zinc loading percentage in the gel, the amount of electrolyte used in the cathode mix, as well as the amount of free electrolyte added to wet the cathode and the separator during cell construction. Specifically, the superabsorbent material is able to allow for an adequate distribution of the electrolyte throughout the anode at anode active sites, which subsequently increases the discharge capacity of the cell. Additionally, when the superabsorbent material is present in the anode within this concentration range, a proper gelling agent concentration can be selected to provide a gel viscosity that allows for better overall processing of the anode gel during cell manufacture.

The aqueous alkaline electrolyte of the present disclosure can be any electrolyte of the type known and used in the production of gelled anodes and alkaline cells. A suitable aqueous alkaline electrolyte is potassium hydroxide. It has been discovered that cell performance is enhanced when potassium hydroxide is provided in the anode at a concentration ranging from about 20% to about 40% by weight of the electrolyte solution, preferably from about 27% to about 37% by weight of the electrolyte solution. Potassium hydroxide concentrations in the electrolyte within this range help to avoid premature anode passivation that can occur in conventional cells.

Various gelling agents are suitable for use in various aspects of the present disclosure. Suitable gelling agents include carboxymethyl cellulose, cross-linked polyacrylic acids, natural gum, and the like. The gelling agent can also be selected from the group consisting of cross-linked polyacrylic acids, such as Flogel® 700 and Flogel® 800 (made by SNF), and cross-linked polyacrylate polymers such as Carbopol® 940, Carbopol® 941, Carbopol® 934 and Carbopol® 676 (made by The Lubrizol Corporation). It can be recognized by those having ordinary skill in the art that the concentrations of the superabsorbent material and the gelling agent can be chosen to produce an anode gel having an optimum viscosity for gel processing and cell manufacture. The concentration range of the gelling agent is dependent upon the concentration of the potassium hydroxide in the gel electrolyte, the amount of zinc loading and the zinc particle size distribution. In one particular embodiment of the present disclosure, the gelling agent is present at a concentration ranging from about 0.45% to about 0.75% by weight of the anode gel. Preferably, the gelling agent is present at a concentration of about 0.6% by weight of the anode gel. In this regard, it is to be noted that the concentrations of the gelling agent may be other than herein described without departing from the scope of the present disclosure, and therefore should not be viewed in a limiting sense.

The present disclosure recognizes that another factor that controls cell performance relates to the surface area of the anode. Specifically, increasing the active anode electrode surface area provides sufficient active reaction sites needed to keep up with the cathodic reaction at high discharge rates. Accordingly, the gelled anode comprises a zinc alloy powder. The zinc alloy powder as described herein is a metal alloy powder comprising zinc alloy particles. As used herein, "zinc" refers to a zinc alloy particle.

The present disclosure further contemplates a zinc alloy powder including zinc alloy particles having a particle size less than about 75 microns (−200 mesh size). That is, zinc alloy particles that pass a 200 mesh screen size can be present in the anode in an amount less than about 15%, by weight relative to the total zinc in the anode (including coarse zinc alloy particles). In a preferred embodiment, zinc alloy particles that pass a 200 mesh screen size are present in the anode in an amount of about 8%, by weight relative to the total zinc in the anode. Zinc alloy particles that pass a 200 mesh screen size are also known as "zinc fines."

One skilled in the art can readily select a suitable zinc alloy powder alloyed with indium (In), Bismuth (Bi), lead (Pb) and/or aluminum (Al). In one preferred embodiment of the present disclosure, the zinc alloy powder comprises lead at a concentration from about 100 parts per million (ppm) to about 550 ppm and comprises bismuth at a concentration from about 40 ppm to about 220 ppm. In another embodiment of the present disclosure, the zinc alloy powder comprises bismuth at a concentration from about 150 ppm to about 250 ppm, indium at a concentration from about 150 ppm to about 250 ppm and aluminum at a concentration from about 70 ppm to about 130 ppm.

In an exemplary embodiment of the present disclosure, the gelled anode can comprise a zinc alloy powder comprising a zinc alloy of lead and bismuth (BP) or comprising a zinc alloy of bismuth, indium and aluminum (BIA). These zinc alloys (i.e., the BP zinc alloy and the BIA zinc alloy) can have a zinc alloy particle size distribution including zinc fines and a zinc loading ranging from about 63% to about 71% zinc loadings.

In one embodiment of the present disclosure, the gelled anode can further comprise organic and/or inorganic inhibitors. The organic and inorganic inhibitors suppress internal pressure build-up within the anode due to unwanted gas formation. Without departing from the scope of the present disclosure, any suitable organic and/or inorganic inhibitors known in the art can be added to the gelled anode. Suitable corrosion or gassing inhibitors may be selected from those generally known in the art, including, for example, phosphate-type corrosion or gassing inhibitors (e.g., RM-510, which is commercially available from Adco (Sedalia, Mo.)) and/or amphoteric-type inhibitors (e.g., Mafo® Mod 13, which is commercially available from BASF (Mount Olive, N.J.)). Preferably, the organic inhibitor is a phosphate ester organic inhibitor, such as RM-510, and the inorganic inhibitor is indium hydroxide. In one particular embodiment of the present disclosure, the organic inhibitor is present at a concentration ranging from about 0.01% (by weight of the anode gel) to about 0.06% (by weight of the anode gel), preferably from about 0.024% to about 0.048% (by weight of the anode gel). In another particular embodiment of the present disclosure, the inorganic inhibitor is present at a concentration ranging from about 0.01% (by weight of the anode gel) to about 0.30% (by weight of the anode gel), preferably from about 0.01% to about 0.02% (by weight of the anode gel). In this regard, it is to be noted that the concentrations of the organic and inorganic inhibitors may be other than herein described without departing from the scope of the present disclosure, and therefore should not be viewed in a limiting sense.

In another embodiment of the present disclosure, the gelled anode can further comprise a silicate additive. Without departing from the scope of the present disclosure, any suitable silicate additive may be added to the gelled anode. When used in an electrochemical cell, the silicate additive can be added to suppress electrical shorting through the separator. Preferably, the silicate additive is a sodium silicate additive sold as Ohka-Seal B. In one embodiment of the present disclosure, the silicate additive is present at a concentration ranging from about 0.05% (by weight of the anode gel) to about 0.15% (by weight of the anode gel), preferably about 0.1% (by weight of the anode gel). In this regard, it is to be noted that the concentrations of the silicate additive may be other than herein described without departing from the scope of the present disclosure, and therefore should not be viewed in a limiting sense.

C. Alkaline Electrochemical Cell

In another embodiment of the present disclosure, an alkaline electrochemical cell is disclosed. The alkaline electrochemical cell comprises a cathode, a gelled anode and a separator disposed between the cathode and the anode. The gelled anode comprises an aqueous alkaline electrolyte, a zinc alloy powder, a gelling agent and a superabsorbent material comprising superabsorbent particles, wherein the superabsorbent material particles have a substantially uniform shape.

Figure 1:
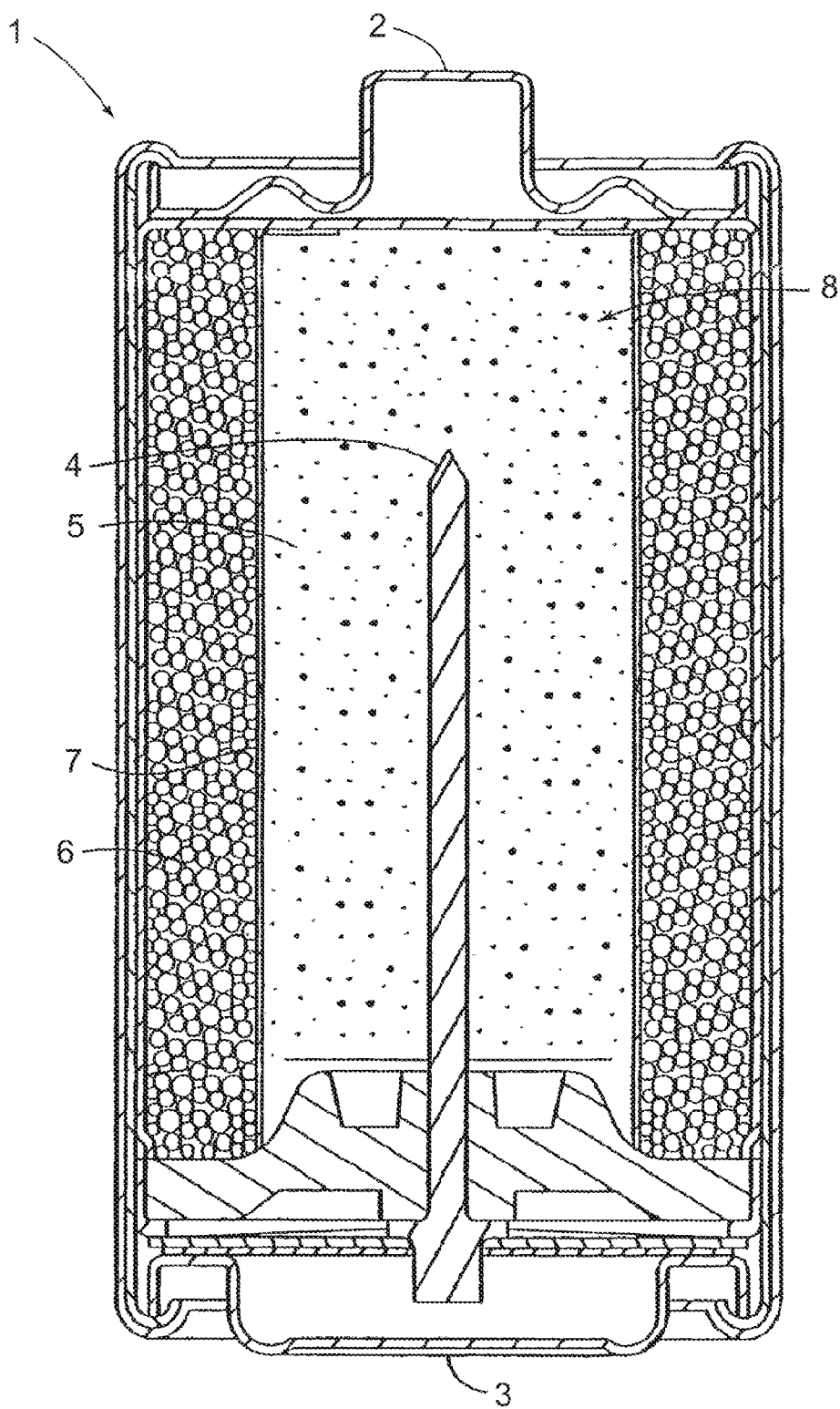
FIG. 1 depicts an exemplary alkaline electrochemical cell of an embodiment of the present disclosure.

FIG. 1 is an exemplary cross-sectional diagram of an alkaline cylindrical cell incorporating the present disclosure. The cell 1 includes a positive terminal 2, a negative terminal 3 and a negative current collector 4. A separator 7 is disposed between the anode 5 and the cathode 6. The anode 5 comprises a superabsorbent material 8 in accordance with the present disclosure. Although a cylindrical cell is shown in FIG. 1, the present disclosure may be applied equally well to any primary alkaline cell, without regard to size or shape, including, but not limited to, sizes AA, AAA, C, D and 9V.

A suitable gelled anode for the exemplary embodiments of the alkaline electrochemical cell can be made in accordance with the gelled anode previously described in this application. That is, the gelled anode of the embodiments of the alkaline electrochemical cell of the present disclosure can comprise the same components as described elsewhere in this application.

The separator of the present disclosure is provided to maintain a physical dielectric separation of the cathode and the anode and allows for transport of ions between the two. Further, the separator acts as a wicking medium for the electrolyte and as a collar that prevents fragmented portions of the anode from contacting the cathode. The separator can be any known separator used in the art, without departing from the scope of the disclosure. For example, the separator can be a layered ion-permeable, non-woven fibrous fabric that is known in the art. A typical separator usually includes two or more layers of paper. In one embodiment of the present disclosure, the separator can be a non-woven fabric rolled into a cylindrical shape that conforms to the inside walls of the cathode and can have a closed bottom end.

Suitable cathodes of the present disclosure can include cathode active materials. A preferred cathode active material is electrolytic manganese dioxide (EMD). EMD is a desirable cathode active material because it has a high density, a high purity and the resistivity is fairly low. An electrically conductive material can be added to the cathode to improve the electric conductivity between individual manganese dioxide particles. Such electrically conductive additives also improve electric conductivity between the manganese dioxide particles and the cell housing, which serves as the cathode current collector. Suitable electrically conductive additives can include, for example, synthetic, natural, or expanded carbon graphite powder types. When the carbon graphite powder is added to the EMD for conductivity enhancement, the ratio of EMD/Carbon ran range from about 11:1 to about 22:1, and preferably from about 16:1 to about 20:1.

In one particular embodiment of the present disclosure, the cathode comprises about 100% premium EMD material, generally of higher open circuit voltage than that of standard EMD material. In another embodiment, the cathode comprises a blend of about 50% premium EMD and about 50% standard EMD. In yet another embodiment of the present disclosure, the cathode comprises about 75% of premium EMD and about 25% of standard EMD. The cathode can also comprise the graphite at about 100% expanded graphite, about 100% synthetic graphite, or, at a synthetic graphite/expanded graphite ratio between about 80% synthetic graphite and about 20% expanded graphite.

The following Examples describe various embodiments of the present disclosure. Other embodiments within the scope of the appended claims will be apparent to a skilled artisan considering the specification or practice of the disclosure as described herein. It is intended that the specification, together with the Examples, be considered exemplary only, with the scope and spirit of the disclosure being indicated by the claims, which follow the Example.

EXAMPLES

The following non-limiting examples are provided to further illustrate the present disclosure.

Example 1

Alkaline Electrochemical Cell Performance Data

In this example, electrochemical cells in accordance with the present disclosure were compared to control cells. The electrochemical cells comprised a gelled anode comprising a superabsorbent material in accordance with the present disclosure (i.e., Flocare® GB300). The superabsorbent material was present in an amount of about 0.085% (by weight of the anode gel). The gelled anode further comprised about 31.17% (by weight of the anode gel) of a KOH—ZnO solution comprising about 28% KOH (by weight of the solution) and about 2% ZnO (by weight of the solution). The gelled anode further comprised about 0.61% (by weight of the anode gel) of a cross-linked polyacrylic acid gellant (i.e., Flogel® 800). The gelled anode also comprised about 0.024% (by weight of the anode gel) of a 10% aqueous solution of phosphate ester organic inhibitor (RM-510), about 0.01% (by weight of the anode gel) of an inorganic inhibitor (indium hydroxide) and about 0.1% (by weight of the anode gel) of an electrical shorting suppressant (sodium silicate additive sold as Ohka-Seal B).

The performance of the cells comprising the Flocare® GB300 was compared to the performance of the control standard cells, which included conventional superabsorbent materials known in the art, such as Salsorb® CL15. The anodes of the control cells comprised 0.062% of Salsorb® CL15 and the remaining components of the anodes of the control cells contained essentially the same components as the anodes of the cells comprising Flocare® GB300. The cathode, separator and electrolyte composition was the same for all cells involved in the testing. The cathode material for the cells in this particular example comprised about 75% of a premium EMD material and about 25% of a standard EMD material.

The testing of the cells included five ANSI discharge performance areas as shown in the performance comparison (TABLE 3). As shown in TABLE 3, the superabsorbent material of the present disclosure improved the overall performance of the cell compared to the control. In particular, with regard to the use of digital cameras and photos, the cells comprising the gelled anode of the present disclosure outperformed the control cells. High rate tests, such as the digital camera test, are strongly affected by the presence of adequate amounts of electrolyte to keep up with the high rate of anode and cathode discharge reactions. Because the superabsorbent materials of the present disclosure (e.g., Flocare® GB300) help to better disperse the electrolyte throughout the anode gel, the superabsorbent materials of the present disclosure enhance the access of electrolyte to zinc active sites and thus improve high rate discharge performance of the cells, such as in the digital still camera and the 1A pulse photos. TABLE 3 shows improved performance in the cells comprising Flocare® GB300 by about 21.5% in the digital camera test and by about 4.8% in the 1A pulse test. About 3.7% of performance gain was also observed at 3.9 ohm of continuous discharge.

TABLE 3

Discharge Performance of LR6 Cells Made with Flocare ® GB300 Relative to that of LR6 Cells made with Salsorb ® CL15.

| Test | Control Cell Salsorb ® CL15 | Test Cell Flocare ® GB300 |
| --- | --- | --- |
| 1500/650 mW Digital Still Camera | 100% | 121.5% |
| 1 A 10 S/M 1 H/D Photo Pulse | 100% | 104.8% |
| 250 mA H/D CD/MD/Game | 100% | 100.7% |
| 24 ohm 15 S/M 8 H/D Remote | 100% | 100.8% |
| 43Ω 4 H/D Radio | 100% | 100.8% |
| 3.9 Ohm Continuous | 100% | 103.7% |

The EMD Premium Content in the Cathode of Both Cells is 75%. Performance of Test Cells is Given in Percentage Relative to the Performance of Control Cells.

Example 2

Alkaline Electrochemical Cell Performance Data

The superabsorbent materials in accordance with the present disclosure were also tested with a cathode material at suppressed levels of a high rate premium EMD material by 25% relative to Example 1. That is, the cathode material in the cells of Example 2 comprises about 50% of a premium EMD material and about 50% of a standard EMD material. All other anode components and respective compositions were the same as those cells described in Example 1. That is, the control cells had a Salsorb® CL15 superabsorbent material and the test cells in accordance with the present disclosure had a Flocare® GB300 superabsorbent material and the rest of the anode composition was the same for both the test cells and the control cells.

As shown in TABLE 4, the superabsorbent material of the present disclosure improved the overall performance of the cell compared to the control. In particular, with regard to the use of digital cameras and photos, the cells comprising the gelled anode of the present disclosure outperformed the control cells, which is in agreement with the results shown in TABLE 3. In both Example 1 and Example 2, the results indicate a cell performance gain at a continuous discharge of 3.9 ohms. In particular, in Example 2 the cells comprising the Flocare® GB300 superabsorbent material had an overall improved 3.9 ohm continuous discharge of about 5.3% compared to the control cells.

TABLE 4

Discharge Performance of LR6 Cells Made with
Flocare ® GB300 Relative to that of
LR6 Cells made with Salsorb ® CL15.

| Test | Control cell (Salsorb ® CL15) | Test Cell (Flocare ®) |
|---|---|---|
| 1500/650 mW, Digital Still Camera | 100% | 111% |
| 1 Amp 10 S/M 1 H/D Photo Pulse | 100% | 100.8% |
| 250 mA 1 H/D CD/MD/Game Hours | 100% | 101.5% |
| 24Ω 15 S/M-8 H/D Remote | 100% | 101% |
| 43Ω 4 H/D Radio | 100% | 101.1% |
| 3.9 Ohm Continuous | 100% | 105.3% |

The EMD Premium Content in the Cathode of Both Cells is 50%. Performance of Test Cells is Given in Percentage Relative to the Performance of Control Cells.

In view of the above, it will be seen that the several advantages of the disclosure are achieved and other advantageous results attained. As various changes could be made in the above processes and composites without departing from the scope of the disclosure, it is intended that all matter contained in the above description and shown in the accompanying drawings shall be interpreted as illustrative and not in a limiting sense.

When introducing elements of the present disclosure or the various versions, embodiment(s) or aspects thereof, the articles "a", "an", "the" and "said" are intended to mean that there are one or more of the elements. The terms "comprising", "including" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

What is claimed is:

1. A gelled anode for use in an alkaline electrochemical cell, the gelled anode comprising:
    an aqueous alkaline electrolyte;
    a zinc alloy powder;
    a gelling agent; and
    a superabsorbent material comprising particles, the superabsorbent material particles having a particle size between about 75 microns and about 500 microns, wherein the superabsorbent material particles have a substantially uniform shape and further wherein at least about 10% by weight of the superabsorbent material particles have a substantially spherical shape.

2. The gelled anode of claim 1, wherein the superabsorbent material is sodium polyacrylate.

3. The gelled anode of claim 1, wherein about 50% (by volume) of the superabsorbent material particles have a particle size of about 300 microns or less.

4. The gelled anode of claim 1, wherein the superabsorbent material is present in an amount of from about 0.02% (by weight of the anode gel) to about 0.2% (by weight of the anode gel).

5. The gelled anode of claim 1, wherein the electrolyte comprises potassium hydroxide.

6. The gelled anode of claim 5, wherein the potassium hydroxide is present in an amount of from about 27% (by weight of the electrolyte solution) to about 37% (by weight of the electrolyte solution).

7. The gelled anode of claim 1, wherein the gelling agent is selected from the group consisting of cross-linked polyacrylic acids and cross-linked polyacrylate polymers.

8. The gelled anode of claim 1, wherein the zinc alloy powder comprises zinc and a metal selected from the group consisting of bismuth, lead, indium, aluminum and combinations thereof.

9. An alkaline electrochemical cell comprising:
    a cathode;
    a gelled anode comprising an aqueous alkaline electrolyte, a zinc alloy powder, a gelling agent, and a superabsorbent material comprising particles, the superabsorbent material particles having a particle size between about 75 microns and about 500 microns, wherein the superabsorbent material particles have a substantially uniform shape and further wherein at least about 10% by weight of the superabsorbent material particles have a substantially spherical shape; and,
    a separator disposed between the cathode and the anode.

10. The alkaline electrochemical cell of claim 9, wherein the superabsorbent material is sodium polyacrylate.

11. The alkaline electrochemical cell of claim 9, wherein about 50% (by volume) of the superabsorbent material particles have a particle size of about 300 microns or less.

12. The alkaline electrochemical cell of claim 9, wherein the superabsorbent material is present in an amount of from about 0.02% (by weight of the anode gel) to about 0.2% (by weight of the anode gel).

13. The alkaline electrochemical cell of claim 9, wherein the electrolyte comprises potassium hydroxide.

14. The alkaline electrochemical cell of claim 13, wherein the potassium hydroxide is present in an amount of from about 27% (by weight of the electrolyte solution) to about 37% (by weight of the electrolyte solution).

15. The alkaline electrochemical cell of claim 9, wherein the gelling agent is selected from the group consisting of cross-linked polyacrylic acids and cross-linked polyacrylate polymers.

16. The alkaline electrochemical cell of claim 9, wherein the zinc alloy powder comprises zinc and a metal selected from the group consisting of bismuth, lead, indium, aluminum and combinations thereof.

* * * * *